(12) United States Patent
Murdoch et al.

(10) Patent No.: US 12,511,616 B2
(45) Date of Patent: Dec. 30, 2025

(54) ANTENNA ASSEMBLY

(71) Applicant: SATO HOLDINGS KABUSHIKI KAISHA, Tokyo (JP)

(72) Inventors: Graham Murdoch, St Peters (AU); Ganesh Nagendra, St Peters (AU)

(73) Assignee: SATO HOLDINGS KABUSHIKI KAISHA, Tokyo (JP)

(*) Notice: Subject to any disclaimer, the term of this patent is extended or adjusted under 35 U.S.C. 154(b) by 370 days.

(21) Appl. No.: 18/019,615

(22) PCT Filed: Aug. 3, 2021

(86) PCT No.: PCT/IB2021/057071
§ 371 (c)(1),
(2) Date: Feb. 3, 2023

(87) PCT Pub. No.: WO2022/029608
PCT Pub. Date: Feb. 10, 2022

(65) Prior Publication Data
US 2023/0289719 A1    Sep. 14, 2023

(30) Foreign Application Priority Data
Aug. 4, 2020    (AU) ................. 2020902729

(51) Int. Cl.
*G06Q 10/087*    (2023.01)
*G06K 7/10*    (2006.01)
(Continued)

(52) U.S. Cl.
CPC ....... *G06Q 10/087* (2013.01); *G06K 7/10316* (2013.01); *H01Q 1/2216* (2013.01); *H01Q 7/00* (2013.01)

(58) Field of Classification Search
CPC .......... G06K 17/0022; G06K 7/10316; G06K 7/10336; G06K 7/10356; G06Q 10/087; H01Q 1/2216; H01Q 7/00
See application file for complete search history.

(56) References Cited

U.S. PATENT DOCUMENTS

2007/0092925 A1*  4/2007  Thorn Leeson ........ A61P 17/00
                                                            435/23
2007/0095926 A1*  5/2007  Zhu .................. G06K 19/07767
                                                            235/492
(Continued)

FOREIGN PATENT DOCUMENTS

EP          2259212 A1    12/2010
JP       2007-70112 A     3/2007
(Continued)

OTHER PUBLICATIONS

International Search Report dated Nov. 9, 2021, issued in counterpart Application No. PCT/IB2021/057071. (5 pages).
(Continued)

*Primary Examiner* — Thien M Le
(74) *Attorney, Agent, or Firm* — WHDA, LLP

(57) ABSTRACT

An RFID read antenna assembly (100) for use on a metal substrate (20) is used to read an RFID tag (22) carried by an article (12) positioned relative to the metal substrate. The antenna assembly comprises a high permeability layer (104) mountable to the metal substrate, an elongate carrier (114) mounted to the high permeability layer and defining a longitudinal axis (106), and at least one antenna coil (102) carried by the elongate carrier. The at least one antenna coil has a plurality of uniformly spaced transversely arranged portions (116) defining a sequence of antenna loops (105) of substantially constant width. The width of each antenna loop
(Continued)

is substantially the same as the spacing between adjacent transversely arranged portions.

27 Claims, 8 Drawing Sheets

(51) Int. Cl.
  *H01Q 1/22* (2006.01)
  *H01Q 7/00* (2006.01)

(56) References Cited

U.S. PATENT DOCUMENTS

| | | | |
|---|---|---|---|
| 2008/0283599 A1* | 11/2008 | Rasband | G06K 7/0008 |
| | | | 235/439 |
| 2008/0316045 A1 | 12/2008 | Sriharto et al. | |
| 2009/0061786 A1* | 3/2009 | Malik | H04B 7/0647 |
| | | | 455/69 |
| 2009/0285330 A1* | 11/2009 | Premakanthan | H03G 3/3047 |
| | | | 375/297 |
| 2010/0029252 A1* | 2/2010 | Rybak | H04L 51/58 |
| | | | 455/414.1 |
| 2010/0219252 A1* | 9/2010 | Kikuchi | H01Q 15/00 |
| | | | 235/488 |
| 2010/0220025 A1* | 9/2010 | Savry | G06K 19/07749 |
| | | | 343/788 |
| 2011/0044376 A1* | 2/2011 | Lin | H04L 1/0606 |
| | | | 455/69 |
| 2011/0074740 A1* | 3/2011 | Liu | G06F 3/047 |
| | | | 345/179 |
| 2014/0304107 A1 | 10/2014 | McAllister | |

FOREIGN PATENT DOCUMENTS

| | | |
|---|---|---|
| JP | 2007-336436 A | 12/2007 |
| WO | 2005/116945 A2 | 12/2005 |
| WO | 2007/099723 A1 | 9/2007 |
| WO | 2009/003231 A1 | 1/2009 |

OTHER PUBLICATIONS

Office Action dated Jul. 25, 2023, issued in counterpart AU Application No. 2021321476. (4 pages).

Office Action dated Feb. 20, 2023, issued in counterpart JP application No. 2023-507964, with English translation. (9 pages).

Office Action dated Apr. 12, 2024, issued in counterpart IN Applicaiton No. 202317005956, with English translation. (6 pages).

* cited by examiner

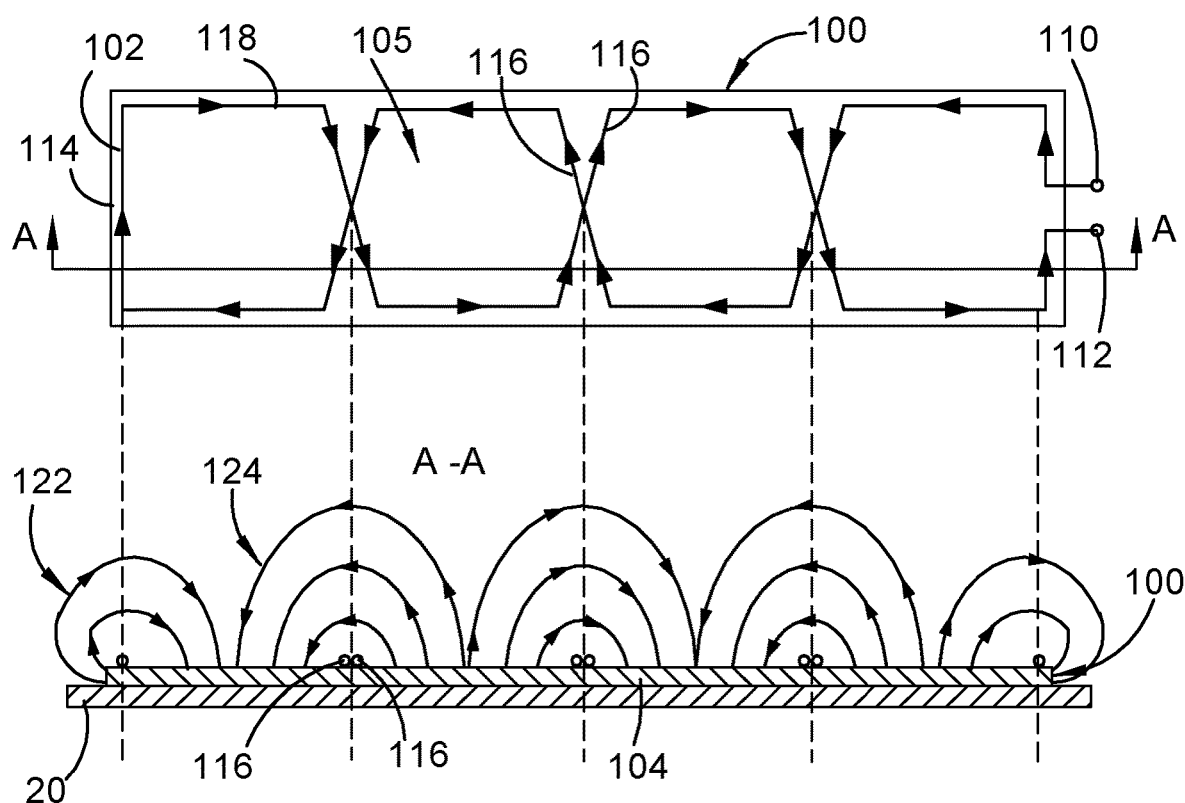
FIGURE 8
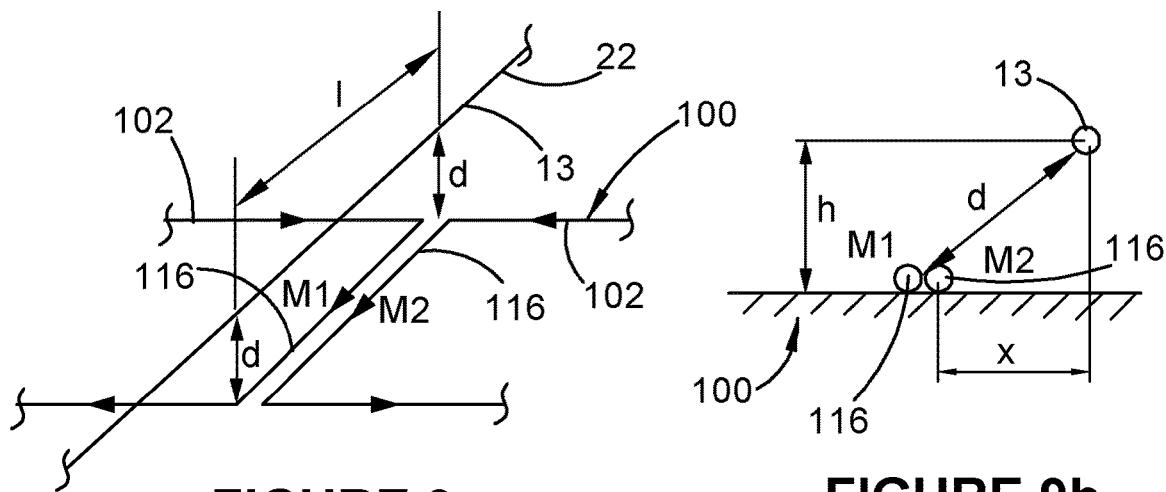
FIGURE 9a
FIGURE 9b

ANTENNA ASSEMBLY

TECHNICAL FIELD

The present disclosure relates, generally, to an antenna assembly and, more particularly, to an RFID read antenna assembly for use with an inventory tracking system for use in tracking and/or locating articles carrying RFID tags. The disclosure has particular, but not necessarily exhaustive, application to an RFID read antenna assembly for use on a metal substrate to read an RFID tag carried by an article positioned relative to the metal substrate.

BACKGROUND

Tracking and/or locating inventory allows for accurate stocktake to be performed and for inventory to be located and retrieved quickly. RFID tag interrogation is a convenient method for tracking and locating inventory, since it does not require users to come into contact with the inventory and can be performed rapidly. Certain types of inventory, such as medical inventory, is stored on metal substrates within an incubator or a cabinet.

In addition, at times, RFID tags are randomly placed on articles resulting in difficulty in an RFID read antenna reading the RFID tag when an article with its RFID tag is subsequently placed in the vicinity of the RFID read antenna.

It will be appreciated that, in this specification, reference to "tracking" is to be understood as including, where appropriate, locating of suitably tagged articles within a receptacle.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

SUMMARY

In a first aspect of the present disclosure, there is provided an RFID read antenna assembly for use on a metal substrate to read an RFID tag carried by an article positioned relative to the metal substrate, the antenna assembly comprising: a high permeability layer mountable to the metal substrate; an elongate carrier mounted to the high permeability layer and defining a longitudinal axis; and at least one antenna coil carried by the elongate carrier, the at least one antenna coil having a plurality of uniformly spaced transversely arranged portions defining a sequence of antenna loops of substantially constant width, the width of each antenna loop being substantially the same as the spacing between adjacent transversely arranged portions.

Each transversely arranged portion may form a transverse part of one of the antenna loops of the at least one antenna coil. The at least one antenna coil may have at least one pair of transversely arranged portions which cross over each other to define a figure of eight-type configuration to form at least one pair of contiguous antenna loops. The at least one antenna coil may include a plurality of pairs of spaced, transversely arranged portions. The spacing between the pairs of the transversely arranged portions of the at least one antenna coil may be constant to form a sequence of antenna loops of substantially constant width. The sequence of contiguous antenna loops may define a series of figure of eight-type configurations.

A part of the at least one antenna coil may have a serpentine configuration. In this specification, unless the context clearly indicates otherwise, the term "serpentine configuration" is to be understood as an arrangement where at least one of an outgoing conductor or a return conductor of the antenna coil has a zigzag- or square wave-like configuration to form a sequence of stepped transitions.

A tag antenna of the RFID tag to be read may be elongate and configured to be placed transversely across the carrier. A width of the tag antenna may approximate the width of each antenna loop of the at least one antenna coil.

The antenna assembly may comprise at least two antenna coils arranged in a longitudinally staggered relationship on the carrier, the antenna coils having the same configuration as each other. The at least two antenna coils may be configured to be driven sequentially. Instead, the at least two antenna coils may be configured to be driven out of phase with each other. The antenna assembly above may comprise two antenna coils. The two antenna coils may be configured to be driven 90° out of phase with each other.

The high permeability layer may comprise a locator configured to cooperate with a complementary feature of the metal substrate for locating the high permeability layer relative to the metal substrate. The high permeability layer may be a ferrite layer.

The antenna assembly may comprise a connector which is configured to be electrically connected to an RFID tag interrogator via a connection arrangement. The metal substrate may be foraminous to facilitate fluid flow through the substrate and past an article arranged on the substrate. The high permeability layer and the elongate carrier may be configured to minimise disruption of the fluid flow past the article.

The high permeability layer may be a first layer. The antenna assembly may include a second high permeability layer mountable, in functionally aligned relationship with the first high permeability layer, to a second metal substrate arranged in spaced, superjacent or subjacent relationship relative to the metal substrate carrying the first high permeability layer.

In another non-limiting embodiment of the present disclosure, there is provided an inventory tracking method for use with a metal substrate, the metal substrate carrying at least one antenna assembly, as described above, the method comprising: positioning an article relative to the antenna coil of the at least one antenna assembly, the article carrying an associated RFID tag and being positioned such that the associated RFID tag and the antenna coil of the at least one antenna assembly are functionally aligned for the associated RFID tag to be interrogated by an RFID tag interrogator via the at least one antenna assembly; and interrogating the associated RFID tag by driving the at least one antenna assembly via the interrogator.

In a non-limiting embodiment in which the at least one antenna assembly comprises at least two antenna coils, the method may comprise driving the at least two antenna coils of the at least one antenna assembly sequentially via the interrogator to interrogate the associated RFID tag.

In a non-limiting embodiment in which the at least one antenna assembly comprises at least two antenna coils, the method may comprise driving the at least two antenna coils of the at least one antenna assembly out of phase with each other via the interrogator to interrogate the associated RFID tag.

The metal substrate may comprise a plurality of discrete elongate compartments with each compartment having a longitudinal axis, an antenna assembly, as described above, being arranged in each one of the compartments with the longitudinal axis of each antenna assembly being substantially co-axial with the longitudinal axis of its associated compartment. The method may comprise arranging the article in its associated compartment such that an antenna coil of the associated RFID tag is arranged transversely to the longitudinal axis of the antenna assembly.

In yet another aspect of the present disclosure, there is provided a method of modifying a metal substrate for tracking inventory, the method comprising: electrically connecting at least one antenna assembly, as described above, to an RFID tag interrogator; and mounting the at least one antenna assembly to the metal substrate.

In still another aspect of the present disclosure, there is provided an inventory tracking system for use with a metal substrate, the system comprising: an RFID tag interrogator; and at least one antenna assembly, as described above, mounted to the metal substrate to communicate with the interrogator.

The system may further comprise at least one RFID tag, the, or each, RFID tag being mountable to an article, the article, in use, being positioned relative to the metal substrate such that the RFID tag and the antenna coil of the at least one antenna assembly are functionally aligned for the associated RFID tag to be interrogated by the interrogator via the antenna assembly.

The system may further include a connection arrangement via which the at least one antenna assembly communicates with the interrogator. The metal substrate may be removably receivable in a holder. The connection arrangement may include at least one connector for establishing, and breaking, electrical contact between the at least one antenna assembly and the interrogator when the metal substrate is inserted into, and removed from, the holder, respectively. The metal substrate and the holder may include complementary retention elements for retaining and locating the metal substrate in position relative to the holder when the metal substrate is inserted into the receiver to facilitate retention of the metal substrate relative to the holder on insertion of the metal substrate into the holder.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

BRIEF DESCRIPTION OF DRAWINGS

Non-limiting embodiments of the disclosure will now be described by way of example only with reference to the accompany drawings in which:

FIG. 8 shows a schematic, top view and a sectional view of the antenna assembly shown in FIG. 5a, the sectional side view showing resultant magnetic fields generated by the antenna coil of the antenna assembly, in use;

FIG. 9a shows a schematic, perspective view of a part of a tag antenna of an RFID tag arranged relative to an antenna coil of the antenna assembly shown in FIG. 5a, FIG. 5b, and FIG. 6, in use, showing the electromagnetic coupling between the tag antenna and the antenna assembly;

FIG. 9b shows a schematic, sectional, side view of the in use configuration shown in FIG. 9a, showing the electromagnetic coupling between the tag antenna and the antenna assembly when the tag antenna is offset relative to transversely arranged portions of the antenna coil of the antenna assembly of FIG. 5a, FIG. 5b, or FIG. 6, in use;

DETAILED DESCRIPTION OF NON-LIMITING EMBODIMENTS

Figure 1:
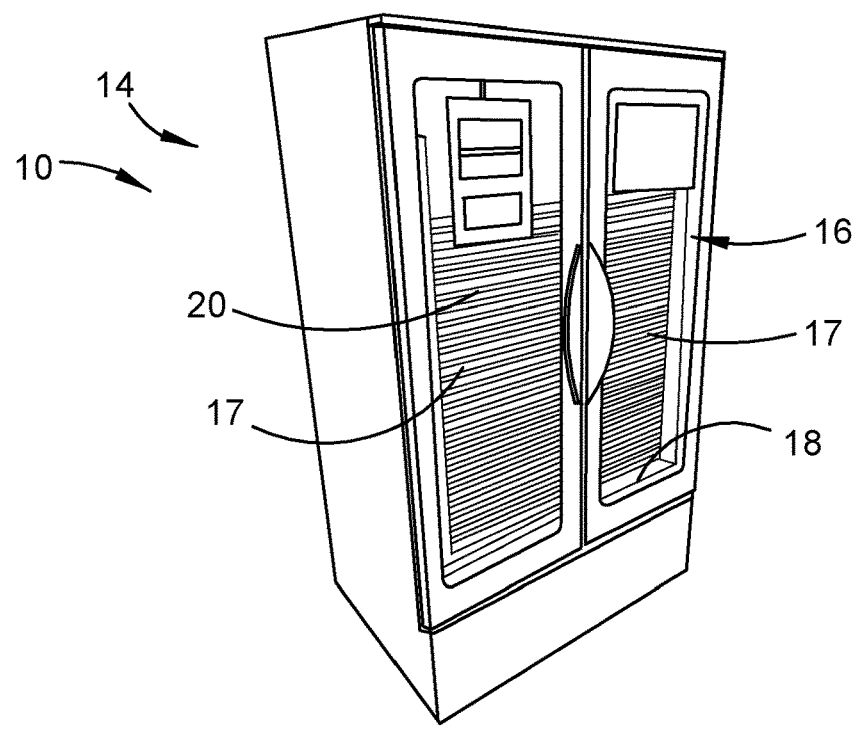
FIG. 1 shows a perspective view of a cabinet including a receptacle, a holder in the form of a frame arranged in the receptacle and metal substrates each in the form of a tray, removably received in the frame.

In the drawings, reference numeral 10 generally designates a non-limiting embodiment of an inventory tracking system for use in tracking articles 12 received in a cabinet 14. As shown in FIG. 1, the cabinet 14 includes a receptacle 16, a holder in the form of a frame 18 arranged in the receptacle 16, and doors 17. The cabinet 14 also includes metal substrates, each in the form of a tray 20. The trays 20 are displaceably and, more particularly, removably, received in the frame 18 and arranged in a spaced, operatively vertically stacked relationship in the frame 18.

The non-limiting embodiment of the cabinet 14 shown in FIG. 1 is an incubator for articles 12, for example the cabinet 14 may be an agitator. Each article 12 may be in the form of a flexible, generally plastics, bag containing bodily fluids, such as blood or blood components, for example, platelets. The contents of each bag needs to be agitated and, as such, the frame 18 is mounted within the receptacle 16 of the cabinet in a reciprocatory manner to be reciprocated relative to the receptacle 16 to effect agitation of the bags 12.

It will be appreciated by a person skilled in the art that, in other non-limiting embodiments (not illustrated), there may only be a single tray 20 removably received in the frame 18, that there may only be a single article 12 received on the tray 20, and/or that the cabinet 14 may be any general cabinet with trays 20.

Figure 2:
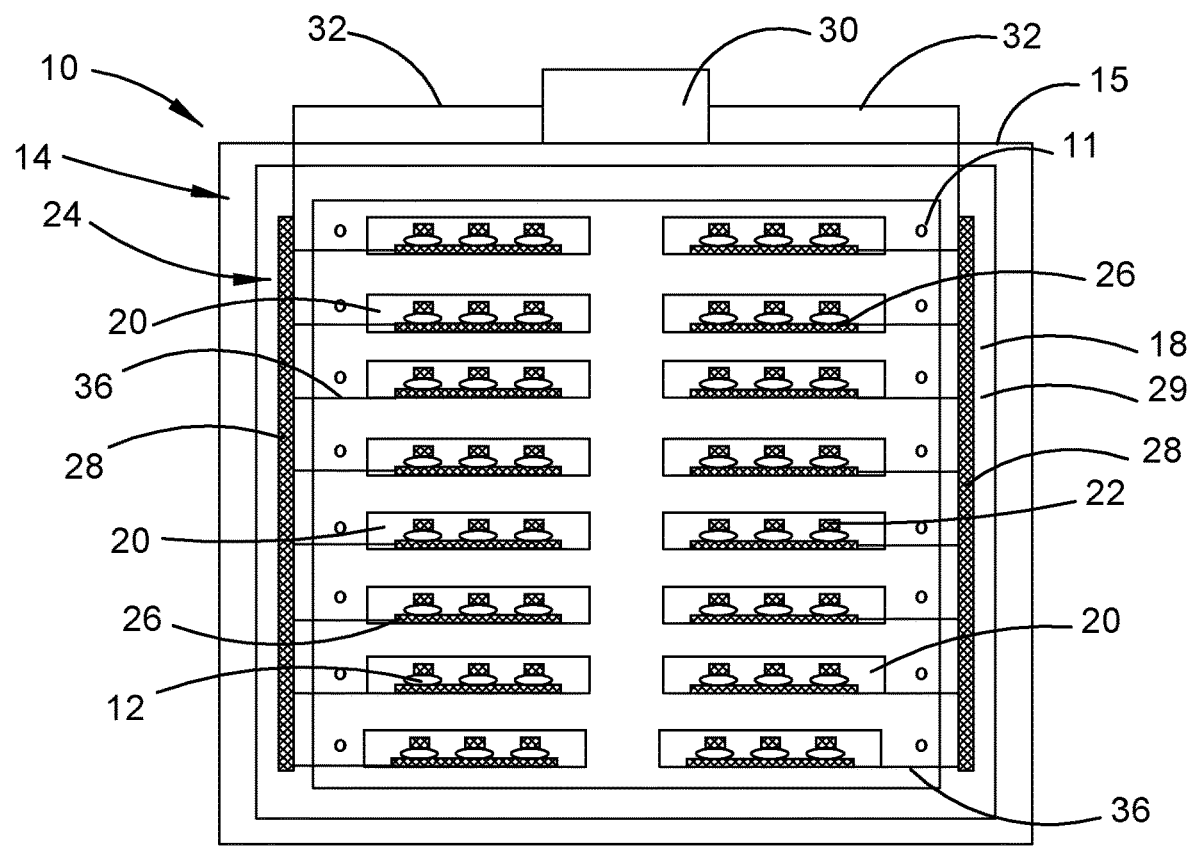
FIG. 2 shows a schematic, front view of a non-limiting embodiment of an inventory tracking system for use in tracking articles received on the trays of the cabinet shown in FIG. 1.

In the schematic representation of the inventory tracking system 10 shown in FIG. 2, each tray 20 is configured to receive a plurality of the bags 12 in operatively horizontally spaced relationship, each bag 12 carrying an elongate RFID tag 22 arranged transversely across the bag 12. Typically, an RFID tag may include an RFID chip and an antenna coil. The inventory tracking system 10 includes an electrical connector arrangement 24 having complementary components in the form of conductor carriers 26, 28, carried by the trays 20 and the frame 18, respectively. Each conductor carrier 26, 28 is in the form of a printed circuit board (PCB).

One PCB 26 is mounted to each tray 20 and carries a set of conductors (not shown) in the form of tracks of the PCB 26. One PCB 28 is mounted to each support stanchion 29 of the frame 18 and carries a second set of conductors (not shown), also in the form of tracks of the PCB 28. PCB 26 and PCB 28 are connected via electrical connection 36.

The inventory tracking system 10 also includes an RFID tag interrogator 30 to which each of the PCBs 28 is connected, as represented schematically by wired electrical connection 32 as shown in FIG. 2. The RFID tag interrogator 30 is configured to interrogate the RFID tag 22 of each bag 12. The RFID tag interrogator 30 is connected to a computer (not shown) either via a wired or a wireless connection.

As indicated above, a PCB 26 is associated with each tray 20 to facilitate interrogation of the RFID tag 22 of each bag 12 on each tray 20 in the cabinet 14 by the RFID tag interrogator 30.

Figure 3:
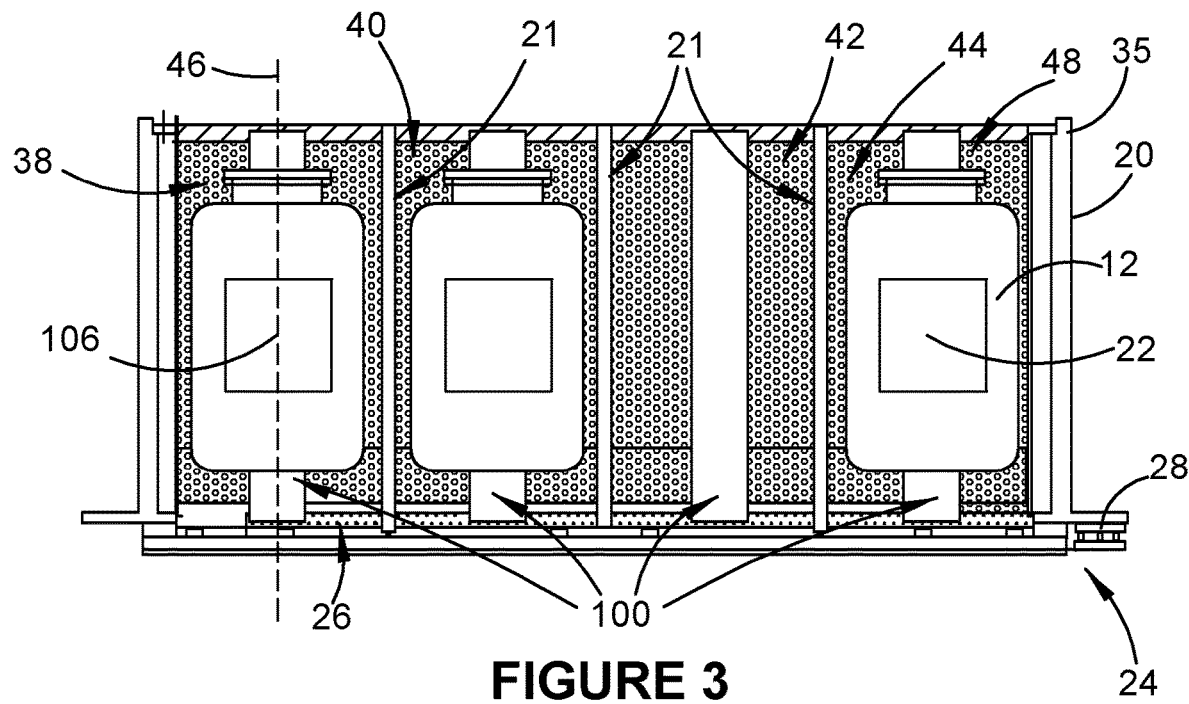
FIG. 3 shows a plan view of one of the trays of the system shown in FIG. 2, in use, with four RFID read antenna assemblies of the inventory tracking system being mounted to the tray, and with four articles being received on the tray, each article being associated with one of the antenna assemblies.

FIG. 3 shows a non-limiting embodiment of one of the trays 20 of the cabinet 14. The tray 20 carries a plurality of laterally arranged dividers 21 defining a plurality of discrete elongate compartments 38, 40, 42, 44 in each of which one of the bags 12, carrying the RFID tag 22, is received.

The inventory tracking system 10 also includes a plurality of RFID read antenna assemblies 100, each of which is in accordance with a non-limiting embodiment of this disclosure and as will be described in greater detail below. Each antenna assembly 100 is for use on the tray 20 to read the RFID tag 22 carried by the bag 12 positioned relative to the tray 20. In the non-limiting embodiment shown in FIG. 3, an antenna assembly 100 is associated with each compartment 38, 40, 42, 44 of each tray 20 of the cabinet 14.

Figure 5A:
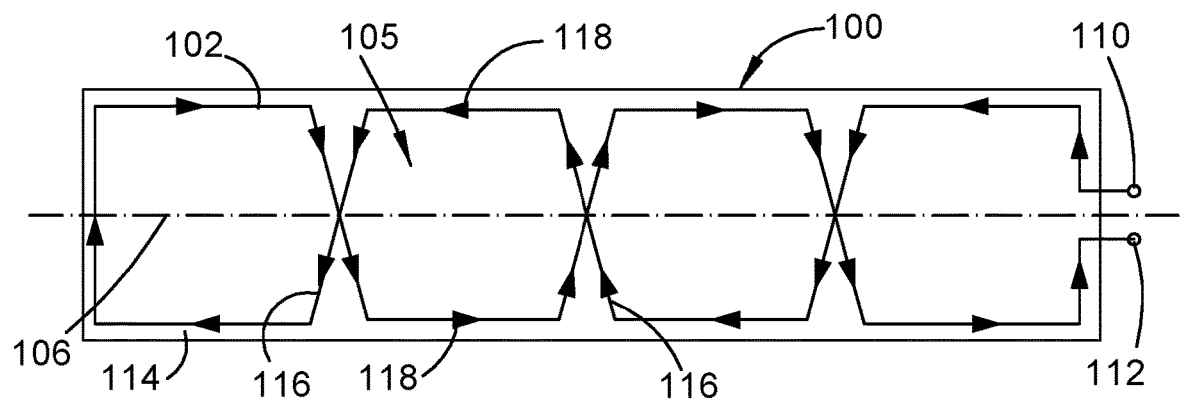
FIG. 5a shows a top view of a non-limiting embodiment of an antenna assembly for use with the tray of the system shown in FIG. 3.
Figure 5B:
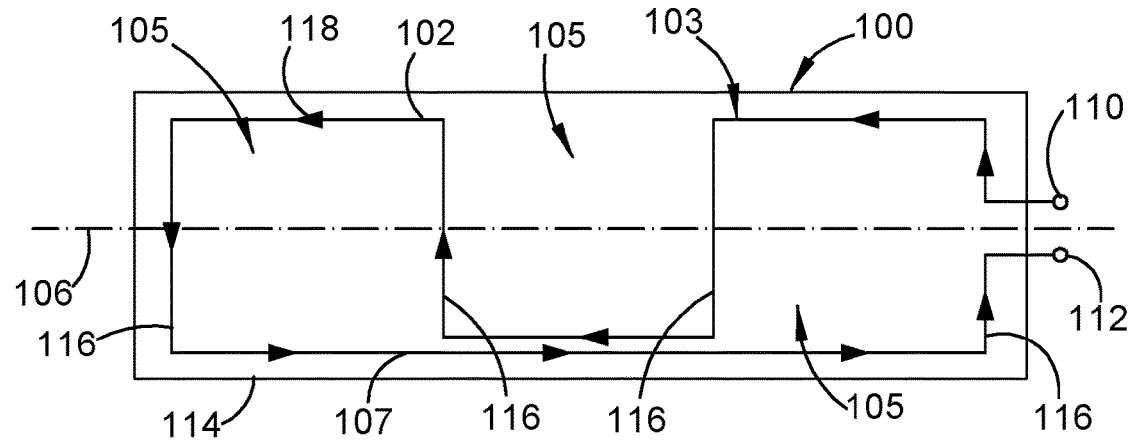
FIG. 5b shows a top view of an alternate non-limiting embodiment of an antenna assembly for use with the tray of the system shown in FIG. 3.
Figure 7A:
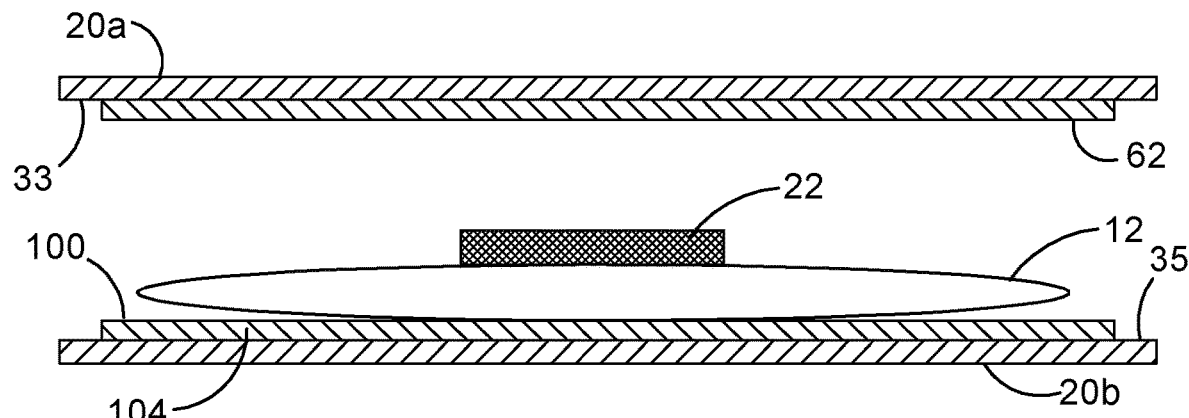
FIG. 7a shows a sectional side view of a part of one non-limiting embodiment of the inventory tracking system mounted on one of the trays of the cabinet, in use, with an article carrying an RFID tag being received on the tray.

Each antenna assembly 100 includes an antenna coil 102, a cover (not shown), a high permeability layer in the form of a ferrite layer 104, and an elongate carrier 114 (FIGS. 5a and 5b). The antenna coil 102 of each antenna assembly 100 terminates in a pair of contacts 110, 112 via which the antenna assembly 100 connects to one of the PCBs 26. Further, each antenna assembly 100 is mounted to the tray 20, with the ferrite layer 104, in this non-limiting embodiment (and also as shown in FIG. 7a), being disposed on an operatively upper surface 35 of the tray 20. Each bag 12 rests on its associated antenna assembly 100, in use. The antenna assembly 100 is visible for compartment 42 in FIG. 3, with the absence of an article 12 therein for the purposes of illustrating the antenna assembly 100 in compartment 42.

Each of the compartments 38, 40, 42, 44 is elongate and defines a longitudinal axis 46, and each antenna assembly 100 is correspondingly elongate, with the elongate carrier 114 defining a longitudinal axis 106. When the antenna assembly 100 is mounted in its associated compartment 38, 40, 42, 44, the longitudinal axis 106 of the antenna assembly 100 lies substantially coaxially with the longitudinal axis 46 of its associated compartment 38, 40, 42, 44. In this way, the RFID tag 22 of the bag 12 associated with that compartment 38, 40, 42, 44 and the antenna coil 102 of the antenna assembly 100 are functionally aligned to facilitate interrogation of the RFID tag 22 by the RFID tag interrogator 30 via the antenna assembly 100 of the compartment 38, 40, 42, 44. It will be understood that the functional alignment between the RFID tag 22 and the antenna assembly 100 is achieved by arranging the bag 12 in its associated compartment 38, 40, 42, 44 such that an antenna coil of the associated RFID tag 22 is arranged transversely to the longitudinal axis 106 of the antenna assembly 100.

FIG. 5a shows a first non-limiting embodiment of the antenna coil 102, which terminates in the pair of contacts 110, 112. The antenna coil 102 communicates with, and is configured to be driven by, the RFID tag interrogator 30 via the pair of contacts 110, 112 and the connector arrangement 24 to carry a current in the direction shown by arrows 118 for interrogating the RFID tag 22. The ferrite layer 104 is mountable to the tray 20 and the elongate carrier 114 is mounted to the ferrite layer 104.

The antenna coil 102 is carried by the elongate carrier 114 and has a plurality of uniformly spaced transversely arranged portions 116 defining a sequence of antenna loops 105 of substantially constant width. The width of each antenna loop 105 is substantially the same as the spacing between adjacent transversely arranged portions 116. In this non-limiting embodiment, each transversely arranged portion 116 forms a transverse part of one of the antenna loops 105 of the antenna coil 102 and the antenna coil 102 has a plurality of pairs of transversely arranged portions 116 which cross over each other to define a series or sequence of figure of eight-type configurations, forming a sequence of contiguous antenna loops 105. It will be appreciated that, in this non-limiting embodiment, the spacing between the pairs of the transversely arranged portions 116 of the antenna coil 102 is constant to form the sequence of substantially constant width antenna loops 105.

It will be understood by those skilled in the art that each pair of transversely arranged portions 116 cross over each other by one of the transversely arranged portions 116 passing through one side of the carrier 114, which may be a PCB, to continue on an opposed side of the elongate carrier 114 while the other transversely arranged portion remains on top of the elongate carrier 114. Instead, the conductors forming each transversely arranged portion 116 may be on the same side of the PCB as each other but are electrically isolated from each other where they cross each other.

It will be appreciated that, in this specification, reference to "contiguous antenna loops" is to be understood as a pair of antenna loops 105 which share a pair of the transversely arranged portions 116 to be physically adjacent or neighbouring antenna loops 105. In the illustrated non-limiting embodiment, three such transversely arranged portions 116 are provided. It will also be appreciated that there may only be a single pair of transversely arranged portions 116 defining a single figure of eight-type configuration to form a single pair of contiguous antenna loops 105.

An alternative non-limiting embodiment is shown in FIG. 5b. With reference to previous non-limiting embodiments, like reference numerals refer to like parts, unless otherwise specified. The antenna coil 102 has a plurality of uniformly spaced transversely arranged portions 116 defining a sequence of spaced antenna loops 105 of substantially constant width. The width of each antenna loop 105 is substantially the same as the spacing between adjacent transversely arranged portions 116. In this non-limiting embodiment, an outgoing conductor 103 (from contact 110) has a serpentine configuration (as defined above) and a return conductor 107 (to contact 112) is substantially rectilinear for the majority of its length, running adjacent and parallel to one of the longitudinal edges of the carrier 114. It will be appreciated that, instead, the return conductor 107 could adopt the serpentine configuration with the outgoing conductor 103 being rectilinear.

As described above, each bag 12, in use, carries blood platelets and it is important that the platelets be agitated while stored in the cabinet 14. If the antenna assembly 100 were too thick, a step may be formed on each side of the antenna assembly 100 and the surface 35 of the associated tray 20. The bag 12 may overlie such a step and create a damming effect of the platelets at the step which is undesirable. Thus, in the case of each antenna assembly 100, each of the ferrite layer 104, the elongate carrier 114, and the cover has a thickness of less than 1 mm, preferably about 0.1-0.5 mm, and, as an example, about 0.2 mm thick to reduce the size of the step and minimise damming of the platelets in the bag 12.

It will be appreciated that there are multiple arrangements of the antenna assembly 100 within the frame 18 as a part of the inventory tracking system 10, which will provide an equivalent technical effect.

Figure 4:
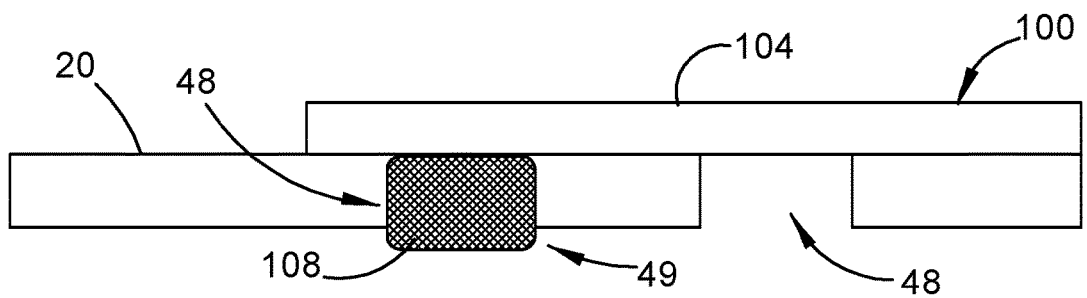
FIG. 4 shows a partial, schematic side view of one of the RFID read antenna assemblies mounted to the tray shown in FIG. 3.

In the illustrated non-limiting embodiment, the tray 20 is foraminous to facilitate fluid flow through the tray 20 and past any article 12 arranged on the tray 20, and defining a plurality of apertures 48 as shown in FIG. 4. In some embodiments, at least one of the apertures 48 of the tray 20 forms a part of a locator mechanism 49. The antenna assembly 100 includes a second part of the locator mechanism 49, in the form of at least one locator pin 108, carried on an operatively bottom surface of the ferrite layer 104. The locator pin 108 is removably received in the aperture 48 to mount and locate the antenna assembly 100 in its compartment 38, 40, 42, 44 of the tray 20. The locator pin 108 is retained in the aperture 48 via a press fit. It will be appreciated that each antenna assembly 100 may comprise a plurality of longitudinally and, optionally, laterally spaced locator pins 108, each locator pin 108 being received in one of the plurality of apertures 48 of the tray 20.

In alternative embodiments, this type of locator mechanism is not used, and locator pins are not required. Instead, the antenna assembly 100 may be configured to be of a shape and size to fit into the tray 20 securely without a locator mechanism.

Figure 6:
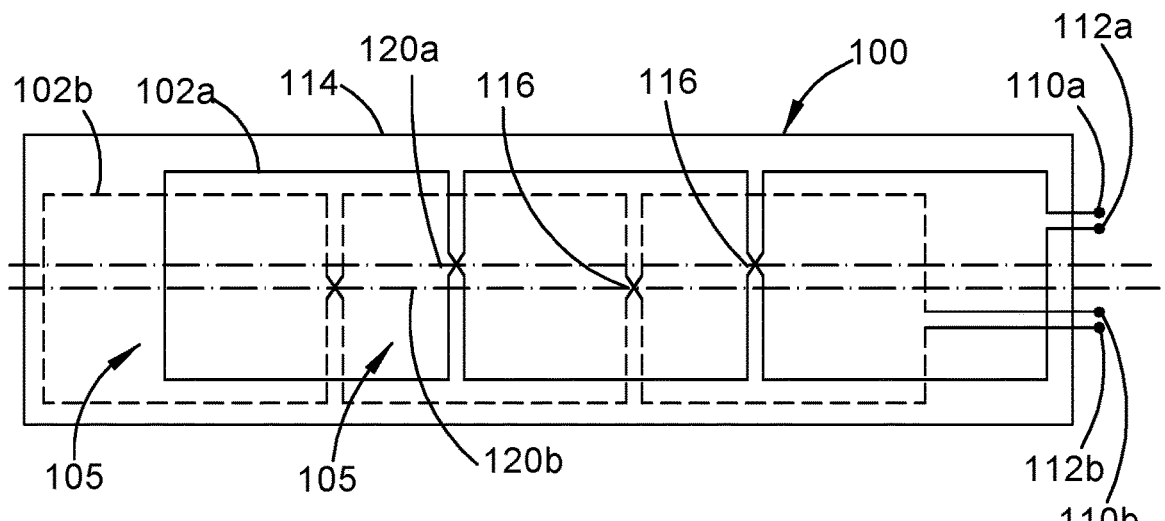
FIG. 6 shows a schematic, top view of another non-limiting embodiment of an antenna assembly for use with the tray of the system shown in FIG. 3.

FIG. 6 shows a second non-limiting embodiment of the antenna assembly 100, with two antenna coils 102a, 102b arranged in a longitudinally staggered relationship on the elongate carrier 114. With reference to previous non-limiting embodiments, like reference numerals refer to like parts, unless otherwise specified. The antenna coil 102b is illustrated in dashed lines to clearly differentiate each antenna coil 102a, 102b. In addition, the two antenna coils 102a, 102b are shown with their longitudinal axes 120a, 120b offset from each other, the axes 120a, 120b being in register with the longitudinal axis 106 of the elongate carrier 114. However, this is for illustrative purposes only and, in practice, the longitudinal axes 120a, 120b of the two antenna coils 102a, 102b, respectively, will be coaxial with each other. The pairs of transversely arranged portions 116 of each antenna coil 102a, 102b are longitudinally spaced from each other. It will be understood that the transversely arranged portions 116 of each antenna coil 102a, 102b are arranged in a similar manner as described above with reference to FIG. 5a.

The antenna coils 102a, 102b have the same configuration as each other, which, in this non-limiting embodiment, is two pairs of transversely arranged portions 116, forming a sequence of three contiguous antenna loops 105. The antenna coils 102a, 102b each terminate in a pair of contacts 110a, 112a, 110b, 112b. The antenna coils 102a, 102b each communicate with, and are configured to be driven by, the RFID tag interrogator 30 via the pairs of contacts 110a, 112a, 110b, 112b and the connector arrangement 24 to interrogate the RFID tag 22 associated with the bag 12. It will be appreciated that, in another non-limiting embodiment, the transversely arranged portions 116 of each antenna coil 102a, 102b may be arranged in a similar manner to that shown in FIG. 5b.

The antenna coils 102a, 102b are configured to be driven sequentially with respect to each other. Alternatively, the antenna coils 102a, 102b are configured to be driven out of phase with each other and, more particularly, the antenna coils 102a, 102b are configured to be driven 90° out of phase with each other. These configurations will be described in more detail below. It will be understood by the person skilled in the art that there may be more than two antenna coils carried by the elongate carrier 114 in order to provide more spaced pairs of transversely arranged portions 116 in which case, where the antenna coils are driven out of phase with each other, the phase difference between the driving current of the antenna coils will differ correspondingly.

Figure 12:
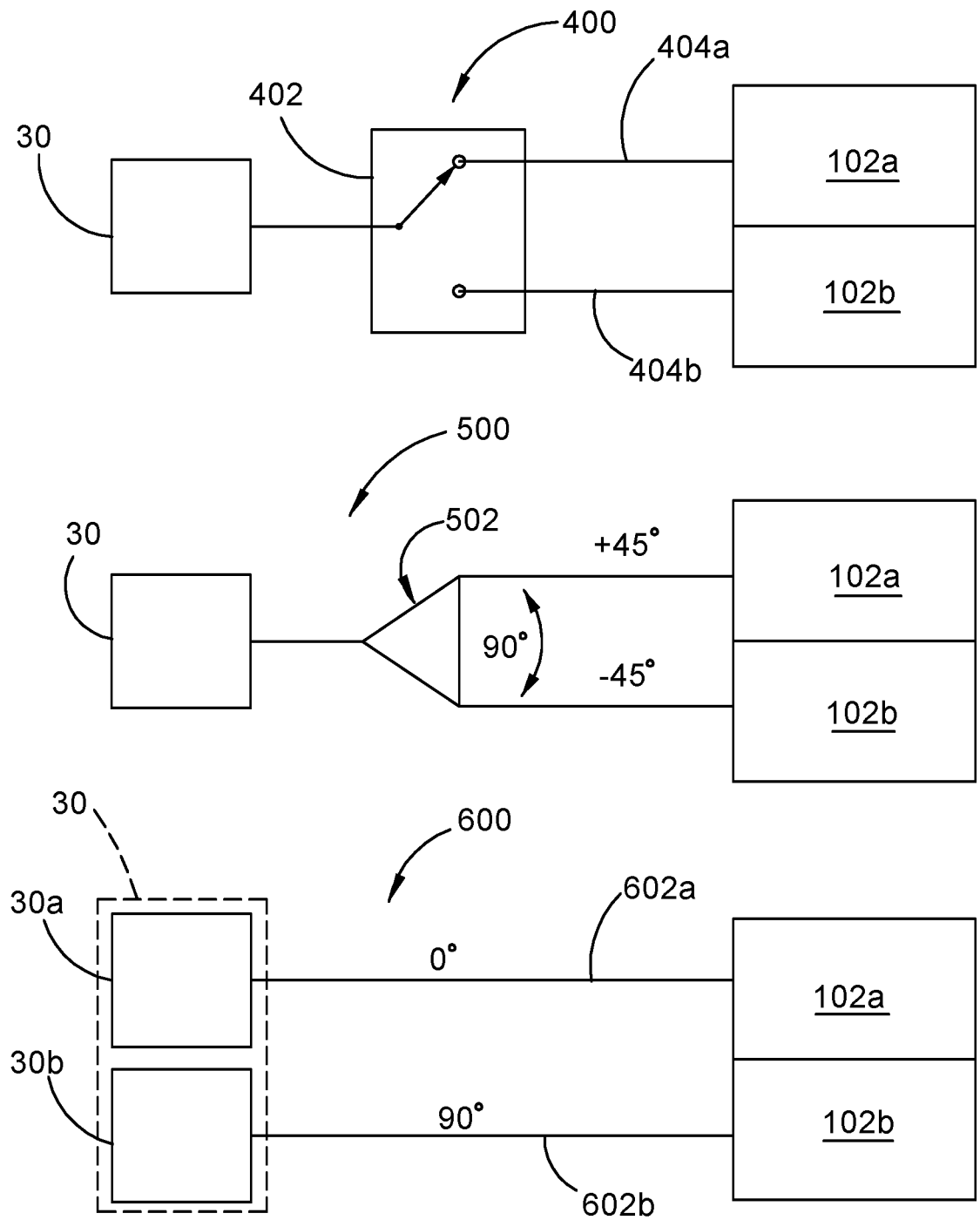
FIG. 12 shows a schematic of various methods used to drive the antenna coils shown in FIG. 6.

The antenna coils 102a, 102b of the non-limiting embodiment of the antenna assembly 100 shown in FIG. 6 may be driven in a number of ways. Three non-limiting examples of suitable methods which may be used are illustrated in FIG. 12. In a first non-limiting embodiment, a driving method 400 is used, which uses a single RFID tag interrogator 30 with a switch 402 that is operable to switch between connections 404a, 404b at a suitable frequency to effectively drive the antenna coils 102a, 102b sequentially.

In a second non-limiting embodiment, a driving method 500 is used, which also employs a single RFID tag interrogator 30 and a single, bifurcating connection 502 used to drive both of the antenna coils 102a, 102b using a single signal which is split into a +45° signal and a −45° signal in order to drive the antenna coils 102a, 102b 90° out of phase with each other.

In a third non-limiting embodiment, a driving method 600 is used. In this non-limiting embodiment, the RFID interrogator comprises two RFID tag drivers 30a, 30b connected to the antenna coils 102a, 102b, respectively, via associated connections 602a, 602b. Each RFID tag driver 30a, 30b is configured to drive its associated antenna coil 102a, 102b at a suitable frequency such that the antenna coils 102a, 102b are driven 90° out of phase with each other.

In the non-limiting embodiment shown in FIG. 7a, each antenna assembly 100 has a second high permeability layer, in the form of a second ferrite layer, 62 associated with it. Each second high permeability layer 62 is mounted to an operatively lower surface 33 of a superjacent tray 20a by press fitting at least one locator pin (not shown) into one of the plurality of apertures 48 via the operatively lower surface 33 of the tray 20a. The second ferrite layer 62 is functionally aligned with the antenna assembly 100 mounted to the surface 35 of the subjacent tray 20b in the manner shown in FIG. 4. The second ferrite layer 62 provides a low reluctance path for a magnetic field emanating from the antenna assembly 100, thereby enhancing mutual inductance between the antenna assembly 100 and the RFID tag 22 carried by the bag 12.

Figure 7B:
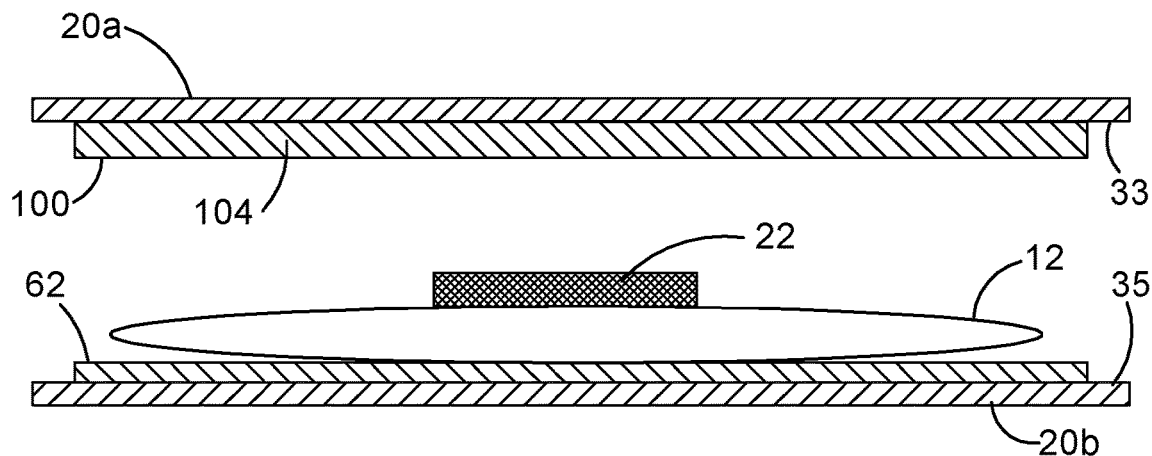
FIG. 7b shows a sectional side view of a part of another non-limiting embodiment of the inventory tracking system mounted on one of the trays of the cabinet, in use, with an article carrying an RFID tag being received on the tray.

As described above, it is preferred that each antenna assembly 100 be made as thin as possible. This can result in manufacturing complexity and there is a risk of damage to the antenna assembly 100 when it is cleaned or removed from its associated tray 20. FIG. 7b shows another non-limiting embodiment of the system 10. With reference to the previous drawings, like reference numerals refer to like parts, unless otherwise specified.

In this non-limiting embodiment, each antenna assembly 100 is mounted to the superjacent tray 20a by press fitting the locator pin 108 into one of the plurality of apertures 48 via the operatively lower surface 33 of the tray 20a (in a similar manner as shown in FIG. 4). In this non-limiting embodiment, each antenna assembly 100, once again, has a second ferrite layer 62 associated with it. Each second ferrite layer 62 is mounted to the subjacent tray 20b by press fitting at least one locator pin (not shown) into one of the plurality of apertures 48 via the operatively upper surface 35 of the subjacent tray 20b to functionally align with its associated antenna assembly 100. The second ferrite layer 62 serves to provide a low reluctance path for a magnetic field emanating from the antenna assembly 100, thereby enhancing mutual inductance between the antenna assembly 100 and the RFID tag 22 carried by the bag 12. The second ferrite layer 62 is thin, being of the order of less than 1 mm thick and, for example, about 0.2 mm thick, thereby reducing the step and potential damming effect of the bag 12 overlying the ferrite layer 62. In this way, the elongate carrier 114 and the ferrite layer 104 are configured to minimise disruption of the fluid flow past the bag 12.

This arrangement is advantageous due to obviating the need for the antenna assembly 100 to be as thin as possible and can, instead, be manufactured using, firstly, a thicker ferrite layer 104 and, secondly, a thicker antenna coil 102. This non-limiting embodiment has the further advantage that the thicker ferrite layer 104 further strengthens the magnetic field enhancing RFID operation between the antenna assembly 100 and the RFID tag 22 carried by the bag 12. The thicker antenna coil 102 is up to about 3.5 mm thick, for example, approximately 1.6 mm thick. The thicker ferrite layer 104 is up to about 2.5 mm thick, for example, between approximately 0.5 mm to 1 mm thick, and, typically, about 0.5 mm thick.

In alternative embodiments, a single ferrite layer may be used under the antenna. In such embodiments, a locator pin and second ferrite layer 62 is not required.

In use, once the inventory tracking system 10 has been installed in the cabinet 14, the user places one bag 12 in each compartment of the tray 20, with each bag 12 having an RFID tag 22 associated with it.

To interrogate the RFID tag 22 of each article 12, the user drives the antenna assemblies 100 of each tray 20 via the RFID tag interrogator 30 and the electrical connector arrangement 24. As shown in the schematic, sectional view A-A of FIG. 8, the user driving the antenna coil 102 of the antenna assembly 100 causes inductive coupling to occur, forming magnetic fields 122 proximate each transversely arranged portion 116. Magnetic fields 122 of crossed-over transversely arranged portions 116 add together to form a stronger resultant magnetic field 124 than the magnetic field 122.

In use, inductive coupling occurs between a tag antenna conductor 13 of the RFID tag 22 and the driven antenna coil/s 102 of the antenna assembly 100. Tag antenna conductor 13 as illustrated in the figures represents the conductor that forms part of the antenna coil of RFID tag 22. The mutual inductance M of a conductor of length l at a distance d from a current carrying conductor of length l is given as:

$$M = \frac{\mu_0 l}{2\pi}(\ln\left(\frac{2l}{d}\right) - 1)$$

FIG. 9a shows a schematic of the tag antenna conductor 13 directly above a pair of transversely arranged portions 116 of one of the antenna coils 102 of the antenna assembly 100. The effective, coupling length l of the tag antenna conductor 13 and the distance d are illustrated and, for purposes of explanation, the bag 12 is not shown. Further, for ease of explanation, the pair of transversely arranged portions 116 is illustrated with the conductors constituting the pair of transversely arranged portions 116 being parallel to each other but not crossed over. The mutual inductance M1, M2 between each transversely arranged portion 116 and the tag antenna conductor 13 is provided by the above formula. However, since there are two current carrying conductors, the mutual inductances M1, M2 add together to produce a total mutual inductance $M_T$, which is given as:

$$M_T = M_1 + M_2 = \frac{\mu_0 l}{\pi}(\ln\left(\frac{2l}{d}\right) - 1)$$

FIG. 9b shows a schematic illustration of a situation in which the tag antenna conductor 13 is offset with respect to a pair of transversely arranged portions 116 of one of the antenna coils 102 of the antenna assembly 100 by an amount denoted as x. In this configuration, d is calculated as follows: $d^2 = h^2 + x^2$. Thus, in this situation, the total mutual inductance $M_T$ between the antenna coil 102 and the tag antenna conductor 13 is reduced.

Figure 10:
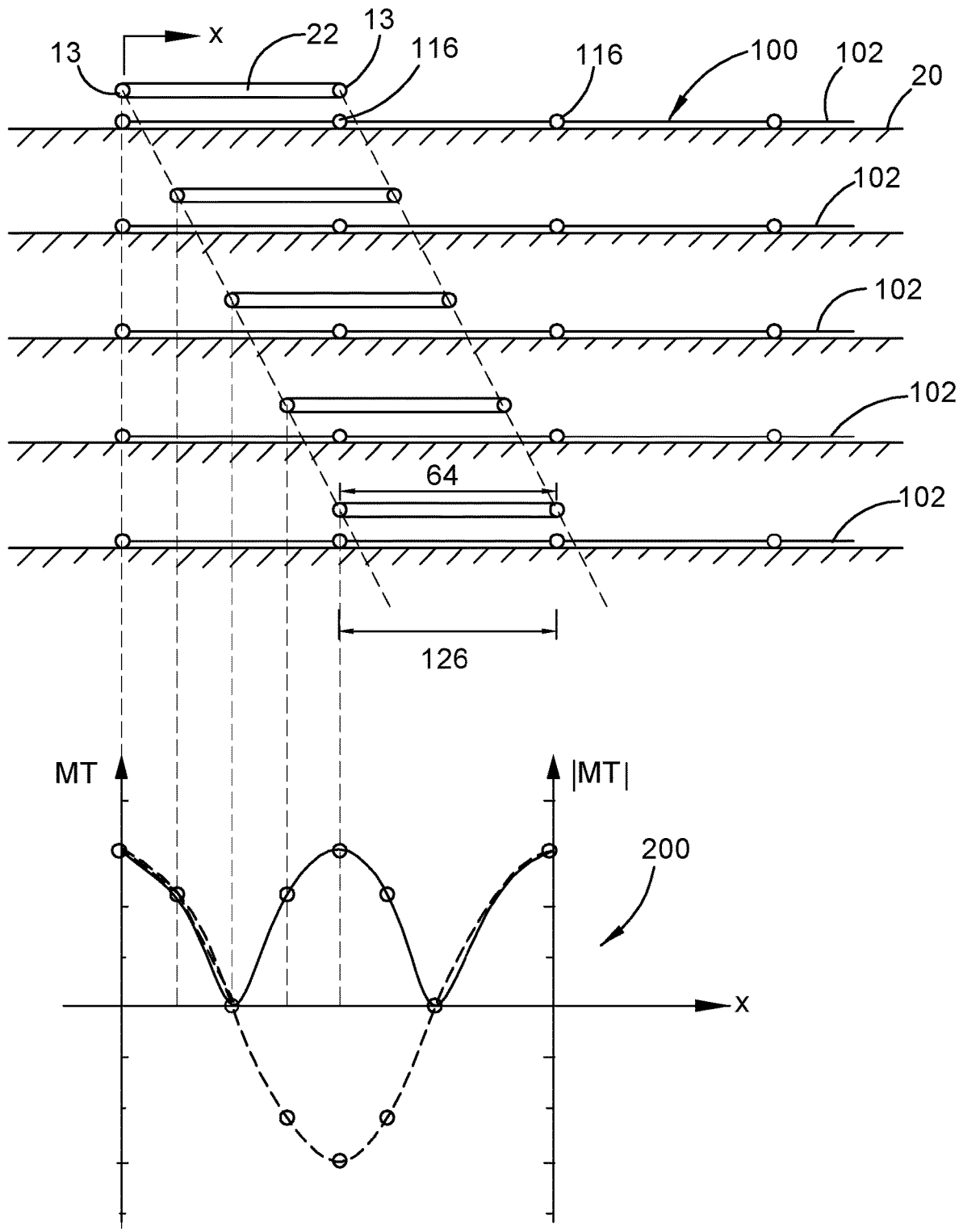
FIG. 10 shows a schematic, sectional, side view of the antenna coil shown in FIG. 5a or FIG. 5b and a normalised mutual inductance vs position plot of various positions of the tag antenna relative to the antenna coil of the antenna assembly, in use.

FIG. 10 shows the RFID tag 22 at varying, horizontal positions relative the antenna assembly 100, with the bag 12 not shown, to illustrate the variety of positions at which the user may place the bag 12 on the tray 20. In this non-limiting embodiment, a width 64 of the tag antenna conductor 13 approximates a spacing 126 between adjacent pairs of the transversely arranged portions 116 and, hence, a width of one of the antenna loops 105 of the antenna coil 102.

The total mutual inductance $M_T$ and an absolute value of the total mutual inductance $|M_T|$ are plotted against the horizontal position x of the tag antenna conductor 13 of the RFID tag 22 along the antenna assembly 100 in a plot 200 in FIG. 10. The absolute or normalised value of the total mutual inductance $|M_T|$ is shown as a solid line and the total mutual inductance $M_T$ is shown as a dashed line on the plot 200. The plot 200 shows that the total mutual inductance $M_T$ is 0 when the tag antenna conductor 13 is positioned approximately midway between transversely arranged portions 116 and is at a maximum when the tag antenna conductor 13 is positioned above transversely arranged portions 116. As a result, when a tag antenna conductor 13 is positioned midway between adjacent pairs of transversely arranged portions 116, there is no, or minimal, coupling between the tag antenna conductor 13 and the antenna assembly 100 and the tag antenna conductor 13 may not be able to be read by the antenna assembly 100 of the system 10.

Figure 11:
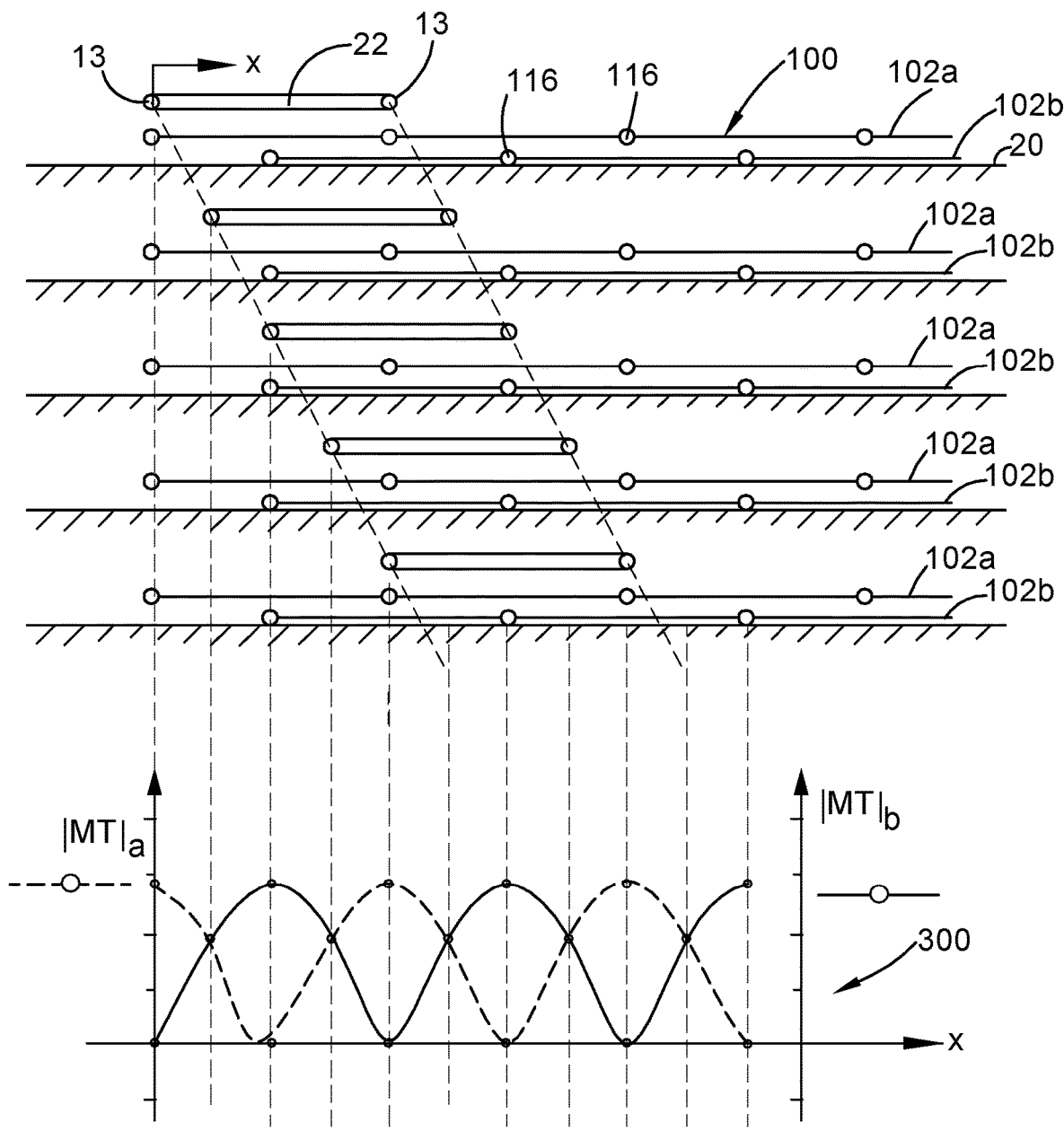
FIG. 11 shows a schematic, sectional, side view of the antenna coils shown in FIG. 6 and a normalised mutual inductance vs position plot of various positions of the tag antenna relative to the antenna coil of the antenna assembly, in use.

To reduce this problem, two longitudinally offset antenna coils are provided as described above with reference to FIG. 6 of the drawings. FIG. 11 shows a schematic representation of an RFID tag 22 at varying, horizontal positions along the non-limiting embodiment of the antenna assembly 100 shown in FIG. 6, with the bag 12 not shown. FIG. 11 further illustrates the variety of positions at which the tag 22 may be placed relative to the antenna assembly 100 on the tray 20.

The absolute, or normalised, value of the total mutual inductance $|M_T|$ of each of the antenna coils 102a, 102b is plotted against the horizontal position x of the tag antenna conductor 13 of the RFID tag 22 along the antenna assembly 100 in a corresponding plot 300 in FIG. 11. The absolute value of the total mutual inductance $|M_T|_a$ from antenna coil 102a is shown as a dashed line and the absolute value of the total mutual inductance $|M_T|_b$ from antenna coil 102b is shown as a solid line in the plot 300. Advantageously, in this non-limiting embodiment, the total mutual inductance $M_T$ produced in the tag antenna conductor 13 does not reach 0 since the tag antenna conductor 13 is always in a position to couple to either of the antenna coils 102a, 102b. In other words, the distance d from the tag antenna conductor 13 and either of the antenna coils 102a, 102b is sufficiently small at each horizontal position x of the tag antenna 22 to produce adequate mutual coupling to enable the antenna assembly 100 to read the tag antenna conductor 13.

Advantageously, the trays 20 within the incubator are foraminous and include the apertures 48 to allow for ventilation. The locator 108 received in the aperture 48 reduces relative movement of the antenna assembly 100 and the RFID tag 22 of the bag 12 as the frame 18 is reciprocated relative to the cabinet 14, thereby assisting in maintaining signal strength.

In addition, the RFID tag 22 is applied to its associated bag 12 as part of a label adhesively attached to an operatively outer surface of the bag 12. As the label could be applied anywhere on the outer surface of the bag 12, the RFID tag 22 may not optimally align with the antenna assembly 100 of the compartment of the tray 20 into which the bag 12 is placed. The use of an elongate, strip antenna assembly 100 assists in minimising misalignment of the RFID tag 22 and the antenna assembly 100. Also, as it is required to pass temperature controlling fluid around the bag 12, the use of an elongate, strip antenna assembly 100 minimises the number of apertures 48 occluded by the antenna assembly 100 allowing ventilation of the bag 12 to occur.

Advantageously, the antenna assembly 100, due to each transversely arranged portion 116, provides a magnetic field 122 which facilitates generation of a total mutual inductance $M_T$ between the tag antenna conductor 13 and the antenna coil 102 which enables the tag antenna conductor 13 to be read by the antenna assembly 100. Further, the crossing over of the pair of transversely arranged portions 116 advantageously provides the stronger magnetic field 124 to increase the prevalence of the total mutual inductance $M_T$. In addition, where multiple antenna coils are provided, driving those antenna coils either sequentially or out of phase with each other facilitates reading of the tag antenna conductor 13 of the RFID tag 22 irrespective of the positioning of the tag antenna conductor 13 relative to the antenna assembly 100.

In some embodiments, each tray 20 (or a group of trays, for example a row of trays) is associated with an indicator 11 configured to indicate status parameters associated with the tray 20. In one example embodiment each tray includes a light panel or light indicator such as a light emitting diode (LED), for example a two-colour LED.

In some example embodiments, the LED can have one colour and is used to indicate that the tray 20 is properly pushed home ensuring good electrical contact between PCB 26 and PCB 28. If contact is not made then the LED does not light up. In other example embodiments, the LED can be configured to display a coded message, for example the LED may be programmed to flash to indicate fill status of the tray 20. Flashing could mean, for example, that there are some empty positions on the tray 20 so that the user can see immediately where to place platelet bags 12 on a tray 20 with space (for example in empty compartment 42 as illustrated in FIG. 3).

In yet further example embodiments, a two-colour LED may be used and programmed to indicate various messages as required. For example, a combination of colour combinations, flashing combinations, or the like may indicate one or more of the tray 20 being properly pushed home (or not), fill status, trays requiring special attention, etc.

The LED indicator 11 allows the user to interact with the cabinet 14 without needing any computer interface (for example). With this simplified interface a user can simply observe the LED colour or code, and thereby know that the tray 20 is properly pushed in, which trays have room for further bags 12, and which trays need special attention.

It is noted that the foregoing has outlined some of the more pertinent non-limiting embodiments. It will be clear to those skilled in the art that modifications to the disclosed non-limiting embodiments can be effected without departing from the scope thereof. As such, the described non-limiting embodiments ought to be considered as merely illustrative of some of the more prominent features and applications. Other beneficial results can be realized by applying the non-limiting embodiments in a different manner or modifying them in ways known to those familiar with the art. This includes the mixing and matching of features, elements and/or functions between various non-limiting embodiments being expressly contemplated herein so that a person of ordinary skill in the art would appreciate from this disclosure that features, elements and/or functions of one embodiment may be incorporated into another embodiment, as those skilled in the art would appreciate from this disclosure that features, elements and/or functions of one embodiment may be incorporated into another embodiment as appropriate, unless described otherwise, above. Although the description is made for particular arrangements and methods, the intent and concept thereof may be suitable for and applicable to other arrangements and applications.

The invention claimed is:

1. An RFID read antenna assembly for use on a metal substrate to read an RFID tag carried by an article positioned relative to the metal substrate, the antenna assembly comprising:

a high permeability layer mountable to the metal substrate;

an elongate carrier mounted to the high permeability layer and defining a longitudinal axis; and at least one antenna coil carried by the elongate carrier, the at least one antenna coil having a plurality of uniformly spaced transversely arranged portions defining a sequence of antenna loops of substantially constant width, the width of each antenna loop being substantially the same as the spacing between adjacent transversely arranged portions;

wherein the metal substrate is foraminous to facilitate fluid flow through the substrate and past an article arranged on the substrate and in which the high permeability layer and the elongate carrier are configured to minimize disruption of the fluid flow past the article.

2. The antenna assembly of claim 1 in which each transversely arranged portion forms a transverse part of one of the antenna loops of the at least one antenna coil and in which the at least one antenna coil has at least one pair of transversely arranged portions which cross over each other to define a figure of eight-type configuration to form at least one pair of contiguous antenna loops.

3. The antenna assembly of claim 2, in which the at least one antenna coil includes a plurality of pairs of spaced, transversely arranged portions and in which the spacing between the pairs of the transversely arranged portions of the at least one antenna coil is constant to form a sequence of antenna loops of substantially constant width.

4. The antenna assembly of claim 3 in which the sequence of contiguous antenna loops defines a series of figure of eight-type configurations.

5. The antenna assembly of claim 1, in which a part of the at least one antenna coil has a serpentine configuration.

6. The antenna assembly of claim 1, in which a tag antenna of the RFID tag to be read is elongate and is configured to be placed transversely across the carrier and in which a width of the tag antenna approximates the width of each antenna loop of the at least one antenna coil.

7. The antenna assembly of claim 1, comprising at least two antenna coils arranged in a longitudinally staggered relationship on the carrier, the antenna coils having the same configuration as each other.

8. The antenna assembly of claim 7, in which the at least two antenna coils are configured to be driven sequentially.

9. The antenna assembly of claim 7, in which the at least two antenna coils are configured to be driven out of phase with each other.

10. The antenna assembly of claim 9, which comprises two antenna coils, and in which the two antenna coils are configured to be driven 90° out of phase with each other.

11. The antenna assembly of claim 1, in which the high permeability layer comprises a locator configured to cooperate with a complementary feature of the metal substrate for locating the high permeability layer relative to the metal substrate.

12. The antenna assembly of claim 1, in which the high permeability layer is a ferrite layer.

13. The antenna assembly of claim 1, which comprises a connector which is configured to be electrically connected to an RFID tag interrogator via a connection arrangement.

14. The antenna assembly of claim 1 in which the high permeability layer is a first layer and in which the antenna assembly includes a second high permeability layer mountable, in functionally aligned relationship with the first high permeability layer, to a second metal substrate arranged in spaced, superjacent or subjacent relationship relative to the metal substrate carrying the first high permeability layer.

15. An inventory tracking method for use with a foraminous metal substrate, the foraminous metal substrate carrying at least one antenna assembly, as claimed in claim 1, the method comprising:
positioning an article relative to the antenna coil of the at least one antenna assembly, the article carrying an associated RFID tag and being positioned such that the associated RFID tag and the antenna coil of the at least one antenna assembly are functionally aligned for the associated RFID tag to be interrogated by an RFID tag interrogator via the at least one antenna assembly; and
interrogating the associated RFID tag by driving the at least one antenna assembly via the interrogator.

16. The method of claim 15, which comprises driving the at least two antenna coils of the at least one antenna assembly, sequentially via the interrogator to interrogate the associated RFID tag.

17. The method of claim 15, which comprises driving the at least two antenna coils of the at least one antenna assembly, out of phase with each other via the interrogator to interrogate the associated RFID tag.

18. The method of claim 15, in which the foraminous metal substrate comprises a plurality of discrete elongate compartments with each compartment having a longitudinal axis, an antenna assembly, as claimed in claim 1, being arranged in each one of the compartments with the longitudinal axis of each antenna assembly being substantially co-axial with the longitudinal axis of its associated compartment, and in which the method comprises arranging the article in its associated compartment such that an antenna coil of the associated RFID tag is arranged transversely to the longitudinal axis of the antenna assembly.

19. A method of modifying a foraminous metal substrate for tracking inventory, the method comprising:
electrically connecting at least one antenna assembly, as claimed in claim 1, to an RFID tag interrogator; and
mounting the at least one antenna assembly to the foraminous metal substrate.

20. An inventory tracking system for use with a foraminous metal substrate, the system comprising:
an RFID tag interrogator; and
at least one antenna assembly, as claimed in claim 1, mounted to the foraminous metal substrate to communicate with the interrogator.

21. The system of claim 20, further comprising at least one RFID tag, the, or each, RFID tag being mountable to an article, the article, in use, being positioned relative to the foraminous metal substrate such that the RFID tag and the antenna coil of the at least one antenna assembly are functionally aligned for the associated RFID tag to be interrogated by the interrogator via the antenna assembly.

22. The system of claim 20 which includes a connection arrangement via which the at least one antenna assembly communicates with the interrogator.

23. The system of claim 22 in which the metal substrate is removably receivable in a holder and in which the connection arrangement includes at least one connector for establishing, and breaking, electrical contact between the at least one antenna assembly and the interrogator when the metal substrate is inserted into, and removed from, the holder, respectively.

24. The system of claim 23 in which the metal substrate and the holder include complementary retention elements for retaining and locating the metal substrate in position relative to the holder when the metal substrate is inserted into the receiver to facilitate retention of the metal substrate relative to the holder on insertion of the metal substrate into the holder.

25. The antenna assembly of claim 1, wherein the RFID read antenna assembly is elongate and has a width smaller than a width of the article thereby allowing fluid flow through the foraminous metal substrate to the article.

26. An inventory tracking system adapted for use in an incubator that comprises at least one foraminous metal substrate divided into a plurality of laterally arranged compartments for receiving respective articles in lateral arrangement, each compartment having a longitudinal axis, the inventory tracking system comprising:
   a plurality of RFID read antenna assemblies adapted to align with and fit inside the plurality of compartments;
   a first conductor carrier mountable to the at least one foraminous metal substrate, the conductor carrier connecting the plurality of RFID read antenna assemblies in operatively horizontally spaced relationship inside the laterally arranged
compartments so that each antenna assembly is arranged in a respective compartment with a longitudinal axis of each antenna assembly being substantially co-axial with the longitudinal axis of its associated compartment; and
   an RFID tag interrogator in communication with the plurality of RFID read antenna assemblies via the first conductor carrier to read RFID tags carried by each article,
wherein each RFID read antenna assembly comprises:
   a high permeability layer mountable to the metal substrate;
   an elongate carrier mounted to the high permeability layer and defining a longitudinal axis; and
   at least one antenna coil carried by the elongate carrier, and
wherein each RFID read antenna assembly is elongate and has a width smaller than a width of an article received in a respective compartment thereby allowing fluid flow through the foraminous metal substrate to the article.

27. The inventory tracking system of claim 26, wherein the incubator is a bodily fluid agitator and wherein the articles are bodily fluid bags.

\* \* \* \* \*